US009465634B2

(12) United States Patent
Yoshida et al.

(10) Patent No.: US 9,465,634 B2
(45) Date of Patent: Oct. 11, 2016

(54) FAULT TOLERANT SYSTEM AND METHOD FOR PERFORMING FAULT TOLERANT

(71) Applicant: YOKOGAWA ELECTRIC CORPORATION, Musashino-shi, Tokyo (JP)

(72) Inventors: Yoshitaka Yoshida, Musashino (JP); Shota Uehara, Musashino (JP); Takeshi Ohno, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 220 days.

(21) Appl. No.: 14/029,064

(22) Filed: Sep. 17, 2013

(65) Prior Publication Data

US 2014/0082617 A1    Mar. 20, 2014

(30) Foreign Application Priority Data

Sep. 18, 2012  (JP) ................................ 2012-204608

(51) Int. Cl.
*G06F 11/16*  (2006.01)
*G06F 9/455*  (2006.01)
(Continued)

(52) U.S. Cl.
CPC ............. *G06F 9/45533* (2013.01); *G05B 9/03* (2013.01); *G06F 9/52* (2013.01); *G06F 11/1484* (2013.01);
(Continued)

(58) Field of Classification Search
CPC ........... G06F 11/2023; G06F 11/2033; G06F 11/1484; G06F 11/1675; G06F 9/30087; G06F 11/1687; G06F 11/2097; G06F 11/1683; G06F 11/1691; G06F 11/2038; G06F 11/3409; G06F 9/45533; G06F 9/52; G05B 9/03
See application file for complete search history.

(56) References Cited

U.S. PATENT DOCUMENTS 6,496,847 B1 * 12/2002 Bugnion ............. G06F 9/45533
703/21
8,572,606 B1 * 10/2013 Agesen et al. ................... 718/1
(Continued)

FOREIGN PATENT DOCUMENTS

JP          6-230992 A     8/1994
JP        2004-46599 A     2/2004
(Continued)

OTHER PUBLICATIONS

Extended European Search Report dated Jan. 28, 2014 issued by the European Patent Office in counterpart European Patent Application No. 13184950.7.

*Primary Examiner* — Lewis A Bullock, Jr.
*Assistant Examiner* — Jacob Dascomb
(74) *Attorney, Agent, or Firm* — Sughrue Mion, PLLC

(57) ABSTRACT

A fault tolerant system includes a primary virtual machine that is formed on a primary machine in which a primary hypervisor runs, and is adapted to input virtual interrupt based on an external interrupt from the primary hypervisor to a primary guest OS, and a secondary virtual machine that is formed on a secondary machine in which a secondary hypervisor runs, and is adapted to input the virtual interrupt to a secondary guest OS on the basis of timing information on the virtual interrupt transmitted from the primary virtual machine. The primary virtual machine is adapted to collect operation performance information from the secondary virtual machine, and to configure an operation performance of the primary virtual machine and an operation performance of the secondary virtual machine so that the operation performance of the primary virtual machine becomes equal to the operation performance of the secondary virtual machine.

17 Claims, 7 Drawing Sheets

(51) Int. Cl.
*G06F 9/52* (2006.01)
*G06F 11/14* (2006.01)
*G06F 11/34* (2006.01)
*G05B 9/03* (2006.01)
*G06F 11/20* (2006.01)

(52) U.S. Cl.
CPC ....... *G06F 11/1675* (2013.01); *G06F 11/1687* (2013.01); *G06F 11/1691* (2013.01); *G06F 11/3409* (2013.01); *G06F 11/1683* (2013.01); *G06F 11/2038* (2013.01); *G06F 11/2097* (2013.01)

(56) References Cited

U.S. PATENT DOCUMENTS 8,621,461 B1 * 12/2013 Chandrachari et al. .......... 718/1
2001/0049726 A1 * 12/2001 Comeau et al. .............. 709/218
2004/0153857 A1    8/2004 Yamazaki et al.
2005/0132364 A1 *  6/2005 Tewari et al. .................... 718/1
2008/0222632 A1    9/2008 Ueno et al.
2008/0288940 A1   11/2008 Adams et al.
2009/0083735 A1 *  3/2009 Kimura ............................ 718/1
2010/0077394 A1 *  3/2010 Wang .................. G06F 9/45533
                                                             718/1
2010/0199276 A1 *  8/2010 Umbehocker .................... 718/1
2012/0096458 A1 *  4/2012 Huang et al. .................... 718/1

FOREIGN PATENT DOCUMENTS

| JP | 2009-80695 A   | 4/2009  |
| JP | 2010-152559 A  | 7/2010  |
| JP | 2011-248809 A  | 12/2011 |
| JP | 2012-70028 A   | 4/2012  |

* cited by examiner

| ADDRESS | INSTRUCTION CODE | |
|---|---|---|
| a1 | CodeA | |
| a2 | CodeB | |
| a3 | CodeC | ⎫ |
| a4 | CodeD | ⎬ THREE TIMES LOOP |
| a5 | CodeE | ⎪ |
| a6 | CodeF | ⎪ |
| a7 | CodeG | ⎭ |
| a8 | CodeH | |

FAULT TOLERANT SYSTEM AND METHOD FOR PERFORMING FAULT TOLERANT

CROSS-REFERENCE TO RELATED APPLICATION(S)

The present application claims the benefit of priority of Japanese Patent Application No. 2012-204608, filed on Sep. 18, 2012. The disclosures of the application are incorporated herein by reference.

BACKGROUND

1. Technical Field

The present disclosure relates to a fault tolerant system using virtual machines and a method for performing a fault tolerant using virtual machines.

2. Related Art

The fault tolerant system is a system that is able to continue operation without crashing the overall system even in a situation where a defect is occurred in a part of a system configuration, and is particularly applied to a system that is required to have a high availability and uninterrupted system availability. For example, a server computer employing a fault tolerant system is capable to output correct data without having a communication error in response to a network access from a client application of an external device even in a situation where a hardware failure is occurred.

As disclosed in JP-A-2009-080695, there has been known a technique that realizes the fault tolerant system in virtual machines running on two computers that communicates each another. The fault tolerant system using the virtual machines synchronizes execution states of those two virtual machines to execute the same operation. When a failure occurs in one of the computers, the virtual machine that operates in the other computer takes over processing, to thereby continuously provide a service of the system without any interruption.

In the fault tolerant system using virtual machines, one of the virtual machines is set as a primary virtual machine, and the other of the virtual machines is set as a secondary virtual machine. The primary virtual machine is configured to execute the same operation ahead of the secondary virtual machine and to take over the control of input/output with respect to external devices.

In general, when two computers that execute the same program receive an input from an external device precisely at the same timing, the two computers execute the same operation, and output the same data. Therefore, when an interrupt is generated based on an external input in the fault tolerant system using the virtual machines, the fault tolerant system allows the primary virtual machine to transmit a timing at which the interrupt is generated to the secondary virtual machine as synchronization information. Then, the secondary virtual machine that is running with a delay generates a virtual interrupt at the same timing as the timing notified by the synchronization information, whereby the primary virtual machine and the secondary virtual machine execute the same operation in synchronization with each other.

FIG. 6 is a block diagram illustrating a configuration of a conventional fault tolerant system using the virtual machines. As illustrated in FIG. 6, a fault tolerant system 60 includes a primary machine 600 and a secondary machine 700 which are connected to each other on a network.

In the primary machine 600, a primary hypervisor 620 is running on a primary hardware 610 which is a physical computer environment, and a primary virtual machine 630 is configured. In the primary virtual machine 630, a primary guest OS (Operating System) 640 is running, and an application 650 is executed on the primary guest OS 640.

The primary hardware 610 is equipped with a variety of devices such as a CPU (Central Processing Unit), a memory, a network interface card (NIC), and a storage.

The primary virtual machine 630 is allocated with a part of a hardware resource of the primary hardware 610, and takes over the control of input/output with respect to the external device in a virtual computer environment. The primary virtual machine 630 is managed by the primary hypervisor 620.

Likewise, in the secondary machine 700, a secondary hypervisor 720 is running on a secondary hardware 710 which is a physical computer environment, and a secondary virtual machine 730 is configured. In the secondary virtual machine 730, a secondary guest OS 740 is running, and an application 750 is executed on the primary guest OS 740.

The secondary hardware 710 is equipped with a variety of devices such as a CPU, a memory, a network interface card (NIC), and a storage.

The secondary virtual machine 730 is allocated with a part of a hardware resource of the secondary hardware 710, and operates in synchronization with the primary virtual machine 630 in a virtual computer environment. The secondary virtual machine 730 is managed by the secondary hypervisor 720.

In the conventional fault tolerant system 60, the execution states of the primary virtual machine 630 and the secondary virtual machine 730 are synchronized with each other in the following procedure.

Upon receiving an external interrupt from the primary hardware 610, the primary hypervisor 620 inputs the external interrupt to the primary virtual machine 630.

Then, the primary virtual machine 630 inputs a virtual interrupt to the primary guest OS 640. Now, an input of the virtual interrupt from the primary virtual machine 630 to the primary guest OS 640 will be described.

When a virtual machine context switching event such as an external interrupt, a privileged instruction, or an exception occurs during processing of the primary guest OS 640, the processing of the primary guest OS 640 is suspended, a guest OS context is switched to a virtual machine context, and the processing is transitioned to the primary virtual machine 630.

If the primary virtual machine 630 needs to input the virtual interrupt on the primary guest OS 640 according to various events at its timing, the primary virtual machine 630 configures the virtual interrupt. When the virtual interrupt is configured, the primary virtual machine 630 terminates the processing, and when the processing is returned to the primary guest OS 640 suspended at the time of generating the event, the virtual interrupt is input to the primary guest OS 640.

When the primary virtual machine 630 inputs the virtual interrupt to the primary guest OS 640, the primary virtual machine 630 transmits the synchronization information to the secondary virtual machine 730. The synchronization information includes identification information on the virtual interrupt, and synchronization timing information for inputting the virtual interrupt.

The synchronization timing information is information for inputting the virtual interrupt to the secondary guest OS 740 at the same timing as that of the virtual interrupt input to the primary guest OS 640, and includes information indicating an execution suspension position and the number of execution instructions specific to the CPU.

As the execution suspension position, a value of a program counter, which indicating an address of an instruction executed when the virtual interrupt is input, may be used. The number of execution instructions may be measured by a CPU execution instruction number counter of a performance counter provided in the CPU.

In measuring the number of execution instructions, when the primary virtual machine 630 inputs the virtual interrupt to the primary guest OS 640, the CPU execution instruction number counter is cleared to zero, and the CPU execution instruction number counter is enabled before restarting the execution of the primary guest OS 640. As a result, the number of instructions executed by the primary guest OS 640 since a previous virtual interrupt input is counted.

When only the execution suspension position is used as the synchronization timing information, a timing of the virtual interrupt input cannot be specified in a case where an instruction indicative of the execution suspension position is included in a loop processing or in a conditional branch destination, because the instruction is executed every time when the loop or the conditional branch is processed.

Also, when only the number of execution instructions is used as the synchronization timing information, the secondary guest OS 740 cannot be suspended with the designated number of execution instructions due to a speed-up technique such as a pipeline processing, and unavoidably be suspended beyond the number of execution instructions. Accordingly, the virtual interrupt cannot be input to the secondary guest OS 740 at the same timing as that of the primary guest OS 640.

Under the circumstance, the execution suspension position and the number of execution instructions are combined together as the synchronization timing information, and the number of execution instructions is confirmed every time the instruction indicated by the execution suspension position in the secondary guest OS 740 is processed. As a result, the secondary guest OS 740 is suspended at the same timing as that when the virtual interrupt is input in the primary guest OS 640.

Therefore, when the primary virtual machine 630 inputs the virtual interrupt to the primary guest OS 640 after suspending the execution of the primary guest OS 640, the primary virtual machine 630 acquires a value of a program counter at the time of suspending the execution by the primary guest OS 640, and a value of the CPU execution instruction number counter to generate the synchronization timing information. Then, the primary virtual machine 630 transmits the identification information on the virtual interrupt and the synchronization timing information to the secondary virtual machine 730 as the synchronization information.

The secondary virtual machine 730 that received the synchronization information suspends the execution of the secondary guest OS 740 according to the synchronization timing information. The operation of the secondary virtual machine 730 in this situation will be described with reference to a flowchart of FIG. 7.

A break instruction is embedded in a program position designated by the execution suspension position of the synchronization timing information (S401), and the secondary guest OS 740 is restarted (S402). Then, when the secondary guest OS 740 stops (yes in S403), the CPU execution instruction number counter is confirmed, and if the counter value matches the designated number of execution instructions (yes in S404), the secondary guest OS 740 is suspended at the stop position (S405). If the counter value does not match the designated number of execution instructions (no in S404), the secondary guest OS 740 is restarted (S402) and repeats confirming the number of execution instructions.

When the secondary virtual machine 730 suspends the secondary guest OS 740, the secondary virtual machine 730 configures the virtual interrupt according to the virtual interrupt identification information of the synchronization information (S406), and restarts the secondary guest OS 740 (S407). As a result, the virtual interrupt is input to the secondary guest OS 740 at the same timing as that of the primary guest OS 640, and the execution states of the primary virtual machine 630 and the secondary virtual machine 730 are synchronized with each other.

When a hardware failure occurs in either one of the primary machine 600 and the secondary machine 700, the synchronization of the execution states is disturbed. When the synchronization of the execution states is disturbed, a value of output data becomes different between the primary virtual machine 630 and the secondary virtual machine 730. Under the circumstance, the fault tolerant system 60 checks an output of the primary virtual machine 630 against an output of the secondary virtual machine 730, and if the values of the output data are different from each other, it is determined that a hardware failure is occurred.

For the purpose of executing this failure determination processing, the secondary virtual machine 730 is equipped with an output data checking unit 731, which collects the output data of the primary virtual machine 630, and checks the collected output data against the output data of the secondary virtual machine 730.

In the fault tolerant system 60, the primary hardware 610 of the primary machine 600 and the secondary hardware 710 of the secondary machine 700 are each configured by a variety of hardware devices such as a CPU, a memory, or a device. However, the performances of both the hardware may not be the same with each other.

For example, there may be a case where the specification of the CPUs is different from each other, or the capacity of the memories is different from each other. Also, both of the devices may be different from each other due to the replacement of the devices in the operation process of the fault tolerant system 60, or a performance difference may occur due to the aged deterioration even if the same devices are used.

For that reason, a difference may occur in the processing speed between the primary virtual machine 630 and the secondary virtual machine 730. As described above, in the fault tolerant system 60, the primary virtual machine 630 is configured to operate ahead of the secondary virtual machine 730. However, for example, if the secondary virtual machine 730 is higher in the processing speed, the advancement of a process may be inverted, and the execution states are not synchronized with each other based on the synchronization information from the primary virtual machine 630. If the primary virtual machine 630 is higher in the processing speed, a delay of the secondary virtual machine 730 may be accumulated.

Also, execution of driver processing may be different between the primary guest OS 640 and the secondary guest OS 740 due to the different devices, and the operation is different therebetween, as a result of which the operation may be out of synchronization.

SUMMARY

For that reason, a structure for compensating the difference in the hardware becomes necessary. Exemplary embodiments of the present invention provide a fault tolerant system and a method for performing a fault tolerant that allows two virtual machines formed on two computers to execute parallel synchronization operation in which a difference between the hardware of the respective computers is appropriately adjusted.

A fault tolerant system according to an exemplary embodiment of the invention, comprises:

a primary virtual machine that is formed on a primary machine in which a primary hypervisor runs, and is adapted to input virtual interrupt based on an external interrupt from the primary hypervisor to a primary guest OS; and a secondary virtual machine that is formed on a secondary machine in which a secondary hypervisor runs, and is adapted to input the virtual interrupt to a secondary guest OS on the basis of timing information on the virtual interrupt transmitted from the primary virtual machine, wherein the primary virtual machine is adapted to collect operation performance information from the secondary virtual machine, and to configure an operation performance of the primary virtual machine and an operation performance of the secondary virtual machine so that the operation performance of the primary virtual machine becomes equal to the operation performance of the secondary virtual machine.

The primary virtual machine may be adapted to notify the secondary virtual machine of the configured operation performance of the secondary virtual machine, and The secondary virtual machine may be adapted to execute operation according to the notified operation performance.

The operation performance may include an operating frequency, and the primary virtual machine may be adapted to collect an operating frequency that is available by the primary virtual machine, and an operating frequency that is available by the secondary virtual machine, and to configure the operating frequency of the primary virtual machine, and the operating frequency of the secondary virtual machine.

If the operation specification of device used by the primary virtual machine and the operation specification of device used by the secondary virtual machine are different from each other, the primary virtual machine may be adapted to emulate processing so that processing for the device used by the primary virtual machine becomes identical with processing for the device used by the secondary virtual machine.

If a difference in the operation specifications of the devices resides in whether a given function is present, or not, the primary virtual machine may be adapted to disable the given function, and to emulate processing so that the processing for the device used by the primary virtual machine becomes identical with the processing for the device used by the secondary virtual machine, and if the difference in the operation specifications of the devices resides in a performance or a capacity, the primary virtual machine may be adapted to allow the processing different in the operation to be executed in an external environment outside of the primary guest OS.

If the operation specification of device used by the primary virtual machine and the operation specification of device used by the secondary virtual machine are different from each other, the secondary virtual machine may be adapted to emulate processing so that the processing for the device used by the secondary virtual machine becomes identical with the processing for the device used by the primary virtual machine.

If a difference in the operation specifications of the devices resides in whether a given function is present, or not, the secondary virtual machine may be adapted to disable the given function, and to emulate processing so that the processing for the device used by the secondary virtual machine becomes identical with the processing for the device used by the primary virtual machine, and if the difference in the operation specifications of the devices resides in a performance or a capacity, the secondary virtual machine may be adapted to allow the processing different in the operation to be executed in an external environment outside of the secondary guest OS.

If the secondary virtual machine is lower in the execution speed than the primary virtual machine even after the operation performance is configured, the secondary virtual machine may be adapted to acquire a degree of delay, and if an acquired value exceeds a predetermined allowable delay time, the secondary virtual machine may be adapted to execute a synchronization initializing process.

If the degree of acquired delay is larger than an assumed amount, the secondary virtual machine may be adapted to detect that a failure occurs.

If the secondary virtual machine is lower in the execution speed than the primary virtual machine even after the operation performance is configured, the secondary virtual machine may be adapted to accelerate a virtual interrupt input timing during idle of the primary guest OS to overcome a delay of the primary virtual machine.

If the primary virtual machine is higher in the execution speed than the secondary virtual machine even after the operation performance is configured, the primary virtual machine may be adapted to execute the operation with pauses in conformity to the execution speed of the secondary virtual machine.

If the secondary virtual machine is higher in the execution speed than the primary virtual machine even after the operation performance is configured, the secondary virtual machine may be adapted to execute the operation with pauses in conformity to the execution speed of the primary virtual machine.

The primary virtual machine and the secondary virtual machine may be adapted to load the contents of the respective storage devices on memories allocated to the respective virtual machines, and to replace a storage device access with a memory access.

When conducting the memory access, the primary virtual machine and the secondary virtual machine may be adapted to input the virtual interrupt to the respective guest OS without waiting for the external interrupt of an access completion.

The primary virtual machine and the secondary virtual machine may be adapted to load the contents of the respective storage devices on RAM disks configured by the respective guest OS, and to replace a storage device access with a RAM disk access.

A method of performing a fault tolerant, according to an exemplary embodiment of the invention, by a primary virtual machine that is formed on a primary machine in which a primary hypervisor runs, and is adapted to input virtual interrupt based on an external interrupt from the primary hypervisor to a primary guest OS, and a secondary virtual machine that is formed on a secondary machine in which a secondary hypervisor runs, and is adapted to input the virtual interrupt to a secondary guest OS on the basis of timing information on the virtual interrupt transmitted from the primary virtual machine, comprises:

collecting operation performance information from the secondary virtual machine; and configuring an operation performance of the primary virtual machine and an operation performance of the secondary virtual machine so that the operation performance of the primary virtual machine becomes equal to the operation performance of the secondary virtual machine.

According to the exemplary embodiments of the invention, in the fault tolerant system and a method for performing a fault tolerant that allows two virtual machines formed on two computers to execute parallel synchronization operation, a difference between the hardware of the respective computers can be appropriately adjusted.

DETAILED DESCRIPTION

Figure 1:
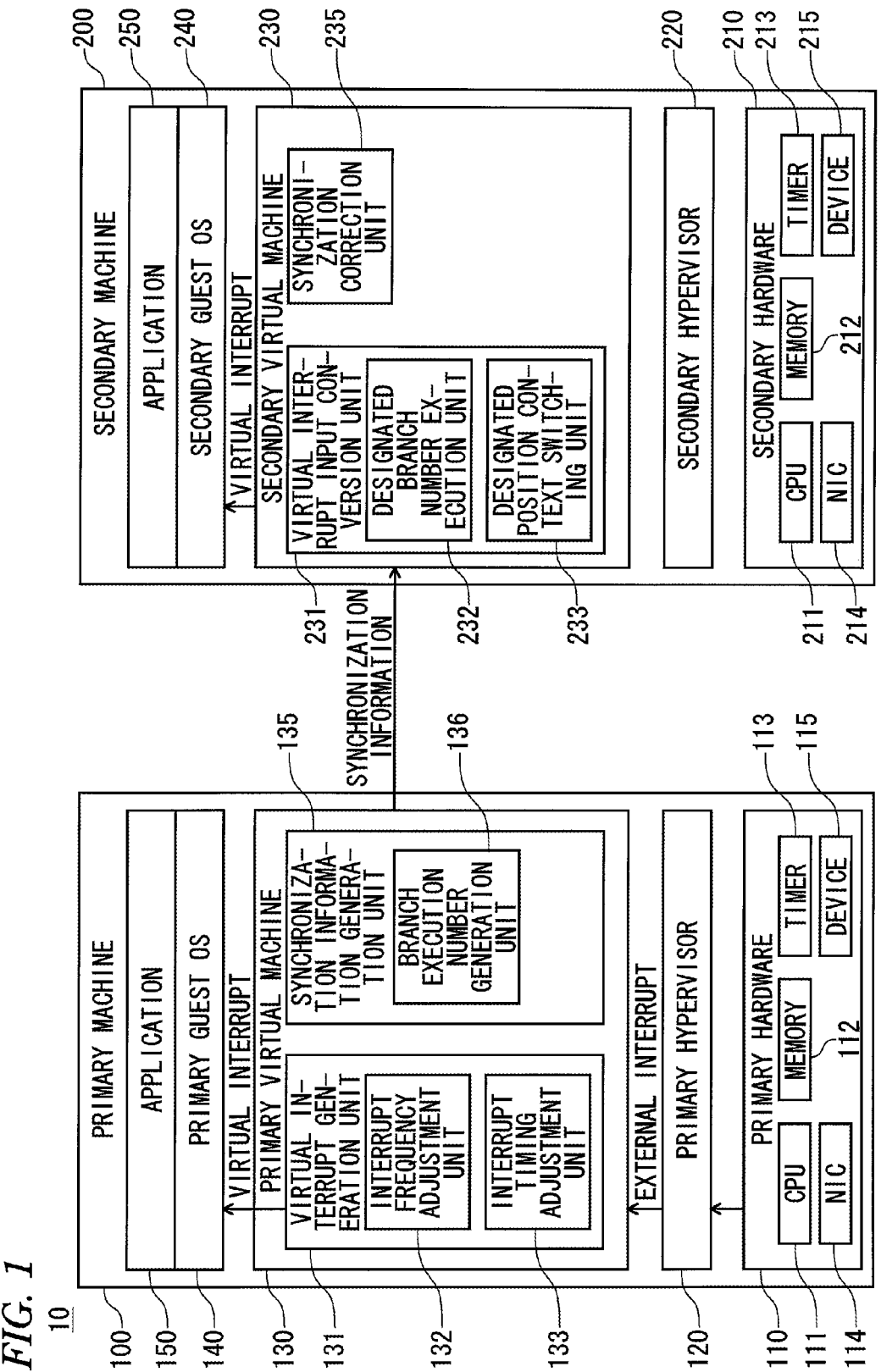
FIG. 1 is a block diagram illustrating a configuration of a fault tolerant system according to an embodiment.

An embodiment according to the present invention will be described with reference to the accompanying drawings. FIG. 1 is a block diagram illustrating a configuration of a fault tolerant system according to the embodiment. As illustrated in FIG. 1, a fault tolerant system 10 includes a primary machine 100 and a secondary machine 200 which are connected to each other by a network. The primary machine 100 and the secondary machine 200 may be configured by a general-purpose computer such as a server computer or a personal computer.

In the primary machine 100, a primary hypervisor 120 is running on a primary hardware 110 which is a physical computer environment, and a primary virtual machine 130 is configured by the primary hypervisor 120. In the primary virtual machine 130, a primary guest OS 140 is running, and an application 150 is executed on the primary guest OS 140.

The primary hardware 110 is equipped with a variety of devices, such as a CPU 111, a memory 112, a timer 113, a network interface card (NIC) 114, and a device 115 such as storage.

The primary virtual machine 130 is allocated with a part of hardware resources of the primary hardware 110, and takes over the control of input/output with respect to an external device. The primary virtual machine 130 serves as a virtual computer environment. The primary virtual machine 130 is managed by the primary hypervisor 120. The primary hypervisor 120 is capable of managing a plurality of primary virtual machines 130.

Likewise, in the secondary machine 200, a secondary hypervisor 220 is running on a secondary hardware 210 which is a physical computer environment, and a secondary virtual machine 230 is configured by the secondary hypervisor 220. In the secondary virtual machine 230, a secondary guest OS 240 is running, and an application 250 is executed on the secondary guest OS 240.

The secondary hardware 210 is equipped with a variety of devices such as a CPU 211, a memory 212, a timer 213, a network interface card (NIC) 214, and a device 215 such as storage.

The secondary virtual machine 230 is allocated with a part of hardware resources of the secondary hardware 210, and runs in synchronization with the primary virtual machine 130 in a virtual computer environment. The secondary virtual machine 230 is managed by the secondary hypervisor 220. The secondary hypervisor 220 is capable of managing a plurality of the secondary virtual machines 230.

In the fault tolerant system 10, input/output with respect to the external device is controlled only by the primary virtual machine 130, and the primary virtual machine 130 runs ahead of the secondary virtual machine 230.

In this embodiment, the primary virtual machine 130 is provided with a virtual interrupt generation unit 131 and a synchronization information generation unit 135, and the secondary virtual machine 230 is provided with a virtual interrupt input conversion unit 231 and a synchronization correction unit 235.

The virtual interrupt generation unit 131 of the primary virtual machine 130 generates the virtual interrupt obtained by adjusting an interrupt frequency and timing of an external interrupt actually input from the primary hypervisor 120, and inputs the generated virtual interrupt to the primary guest OS 140. The virtual interrupt generation unit 131 is provided with an interrupt frequency adjustment unit 132 that adjusts the frequency of interrupt and an interrupt timing adjustment unit 133 that adjusts the interrupt timing.

The synchronization information generation unit 135 of the primary virtual machine 130 specifies a timing of the virtual interrupt, which is adjusted and input to the primary guest OS 140, based on an execution suspension position and the number of branch executions. The synchronization information generation unit 135 is equipped with a branch execution number generation unit 136 that counts the number of branches of a program in the primary guest OS 140 until the virtual interrupt is input.

The synchronization information generation unit 135 collects operation performance information from the secondary virtual machine 230 prior to the parallel synchronization operation of the primary virtual machine 130 and the secondary virtual machine 230. When a hardware configuration is different between the primary hardware 110 and the secondary hardware 210, the synchronization information generation unit 135 generates synchronization correction information for correcting a difference in processing speed, and transmits the synchronization correction information to the synchronization correction unit 235 of the secondary virtual machine 230. The synchronization information generation unit 135 adjusts the operation of the primary virtual machine 130 as occasion demands.

The virtual interrupt input conversion unit 231 of the secondary virtual machine 230 advances the process of the secondary guest OS 240 to the virtual interrupt input position, and suspends the secondary guest OS 240 according to the synchronization timing information of the synchronization information transmitted from the primary virtual machine 130. Then, the virtual interrupt input conversion unit 231 receives the virtual interrupt. In order to advance the process of the secondary guest OS 240 to the virtual interrupt input position, and suspend the secondary guest OS 240, the virtual interrupt input conversion unit 231 is provided with a designated branch number execution unit 232 and a designated position context switching unit 233.

The synchronization correction unit 235 of the secondary virtual machine 230 adjusts the operation of the secondary virtual machine 230 based on the synchronization correction information transmitted from the synchronization information generation unit 135 of the primary virtual machine 130 prior to the parallel synchronization operation. The synchronization correction unit 235 adjusts a difference of processing speed between the primary virtual machine 130 and the secondary virtual machine 230 in the parallel synchronization operation as occasion demands.

(Outline of Parallel Synchronization Operation)

Subsequently, a description will be given of an outline of the parallel synchronization operation of synchronizing the execution states of the primary virtual machine 130 and the secondary virtual machine 230 with each other in the fault tolerant system 10 configured as described above, with reference to a flowchart of FIG. 2. Specifically, a sequence of operation when the primary hypervisor 120 receives the external interrupt from the primary hardware 110 will be described.

Upon receiving the external interrupt from the primary hardware 110 (S101), the primary hypervisor 120 inputs the external interrupt to the primary virtual machine 130 (S102).

The primary virtual machine 130 that received the external interrupt from the primary hypervisor 120 inputs the virtual interrupt to the primary guest OS 140. In this situation, the primary virtual machine 130 does not input the virtual interrupt to the primary guest OS 140 for all of the input external interrupts, but the interrupt frequency adjustment unit 132 adjusts the frequency of the virtual interrupt that is input to the primary guest OS 140 (S103).

In the fault tolerant system 10 using the virtual machines, when the virtual interrupt is input to the primary guest OS 140, in order to synchronize the execution states with each other, the processing of inputting the virtual interrupt to the secondary guest OS 240 at the same timing is also conducted. Accordingly, when the virtual interrupt frequently occurs in the primary virtual machine 130, a processing load for synchronization of the execution states is increased, and resources such as a CPU time or a communication band to be allocated to an original service are reduced.

In the fault tolerant system 10 according to this embodiment, the interrupt frequency adjustment unit 132 adjusts the frequency of the virtual interrupt to minimize the processing load for synchronization of the execution states, and prevents the processing power for the original service from being reduced. The details of the interrupt frequency adjustment operation executed by the interrupt frequency adjustment unit 132 will be described later.

As a result of adjusting the frequency of the virtual interrupt by the interrupt frequency adjustment unit 132 (S103), if it is determined that the virtual interrupt is generated (yes in S104), the virtual interrupt is input to the primary guest OS 140. If it is determined that the virtual interrupt is not generated (no in S104), this processing is completed, and the process waits for input of a subsequent external interrupt from the primary hypervisor 120.

When the virtual interrupt is input to the primary guest OS 140, the primary guest OS 140 should be suspended at a position where the secondary guest OS 240 is also be suspended at the same position.

For example, when the primary guest OS 140 is suspended to transfer the control to the primary virtual machine 130 according to a virtual machine context switching event such as the external interrupt, a suspension position of the primary guest OS 140 may be in a critical section. The critical section is a section in a program that crashes a process when a plurality of processing is executed on a single resource at the same timing, and is a section where an exclusive control such as break instruction disablement is performed by the program.

In this case, when the virtual interrupt is input to the primary guest OS 140 at the suspension position, which is within the critical section, even if the break instruction is embedded in the same position, the secondary guest OS 240 cannot be suspended at the same position, and the secondary guest OS 240 is suspended after processing the critical section. In this case, the virtual interrupt position is shifted, and the execution states become out of synchronization.

Under the circumstances, in the fault tolerant system 10 according to this embodiment, the interrupt timing adjustment unit 133 adjusts the virtual interrupt timing (S105), and suspends the primary guest OS 140 with the avoidance of the critical section, thereby being capable of suspending the secondary guest OS 240 at the same position. The details of the virtual interrupt timing adjustment operation performed by the interrupt timing adjustment unit 133 will be described later.

When the virtual interrupt timing is adjusted, the primary virtual machine 130 inputs the virtual interrupt to the primary guest OS 140 (S106). Then, the synchronization information generation unit 135 generates the synchronization information (S107).

The synchronization information includes the identification information on the virtual interrupt and the synchronization timing information. The synchronization timing information includes the execution suspension position indicated by the program counter, and the number of CPU execution instructions measured by the performance counter.

However, as for a special instruction unique to a specific CPU, there is a case in which count omission of the performance counter may occur, and the number of CPU execution instructions executed by the primary guest OS 140 until the virtual interrupt is input may not be accurately counted. For example, in a Pentium (registered trademark) processor made by Intel Corporation, the execution of an REP instruction is not counted up when the execution of the REP instruction is suspended due to the occurrence of the external interrupt. Accordingly, the CPU execution instruction number counter may become smaller than the actual number of execution instructions.

In this way, because the number of CPU execution instructions count may be inaccurate, the fault tolerant system 10 according to this embodiment does not use the number of CPU execution instructions for the synchronization timing information.

However, because the program generally includes a large amount of loop statements, jump statements, and branch statements, the same instruction is executed for number of times. For that reason, the input timing of the virtual interrupt may not be specified by only the execution suspension position.

Under the circumstance, the fault tolerant system 10 according to this embodiment allows the synchronization timing information to include the execution suspension position and the number of branches. The number of branches represents the number of branch instructions executed from the previous virtual interrupt to the current virtual interrupt, which is the number of times the execution order is changed from sequential execution.

By counting the number of branches in the primary guest OS 140 in advance, the execution suspension position may be specified correctly as the virtual interrupt input position in the secondary guest OS 240 by finding a position that is executed for the first time after executing the branches for the counted number.

Figures 3A, 3B:
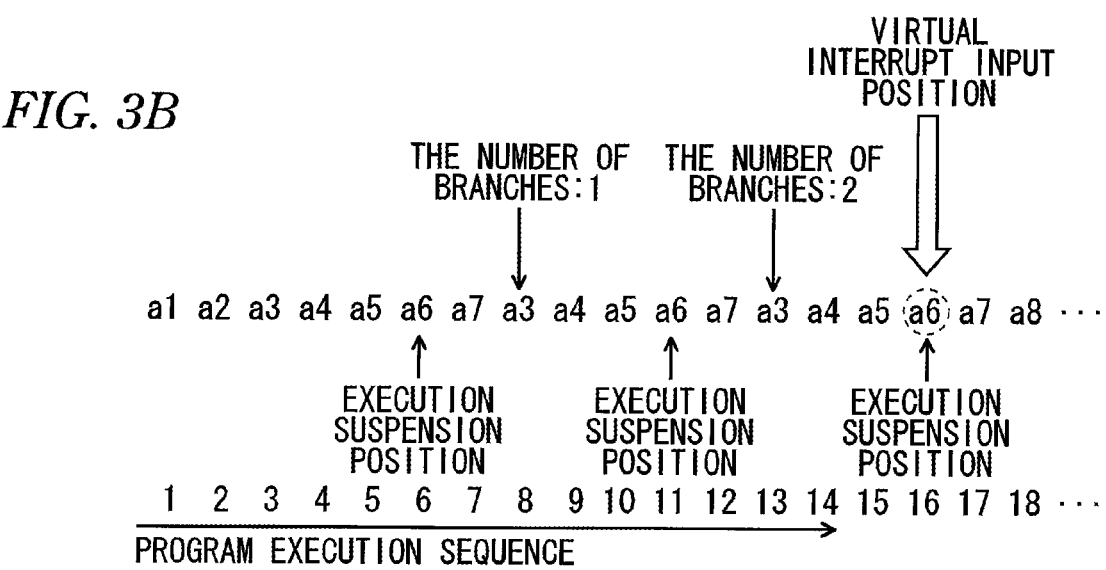
FIGS. 3A and 3B are diagram s illustrating identification of a virtual interrupt input position by the number of branches and an execution suspension position.

For example, as illustrated in FIG. 3A, it is assumed that when instruction codes Code A, Code B, Code C, . . . are allocated to instruction addresses a1, a2, a3, . . . , and Code C to Code G are looped three times, the virtual interrupt is input at "a6" of a $16^{th}$ program execution order in the primary guest OS 140. This synchronization timing can be represented by the count value "2" of the number of branches, and the execution suspension position "a6".

In this case, in the secondary virtual machine 230, the number of branches is counted twice, and the secondary guest OS 240 is suspended at the first execution suspension position "a6", thereby being capable of inputting the virtual interrupt at the same timing as that of the primary guest OS 140.

In order to thus execute the processing of counting the number of branches, the synchronization information generation unit 135 is provided with the branch execution number generation unit 136. In an instruction code level, all of the loop statements, the jump statements, and the branch statements are replaced with the branch instructions. Therefore, the branch execution number generation unit 136 counts the number of branch instructions executed by the primary guest OS 140, thereby being capable of counting the number of branches, in the running application 150. To count of the number of branches, a performance counter may be used.

Figure 2:
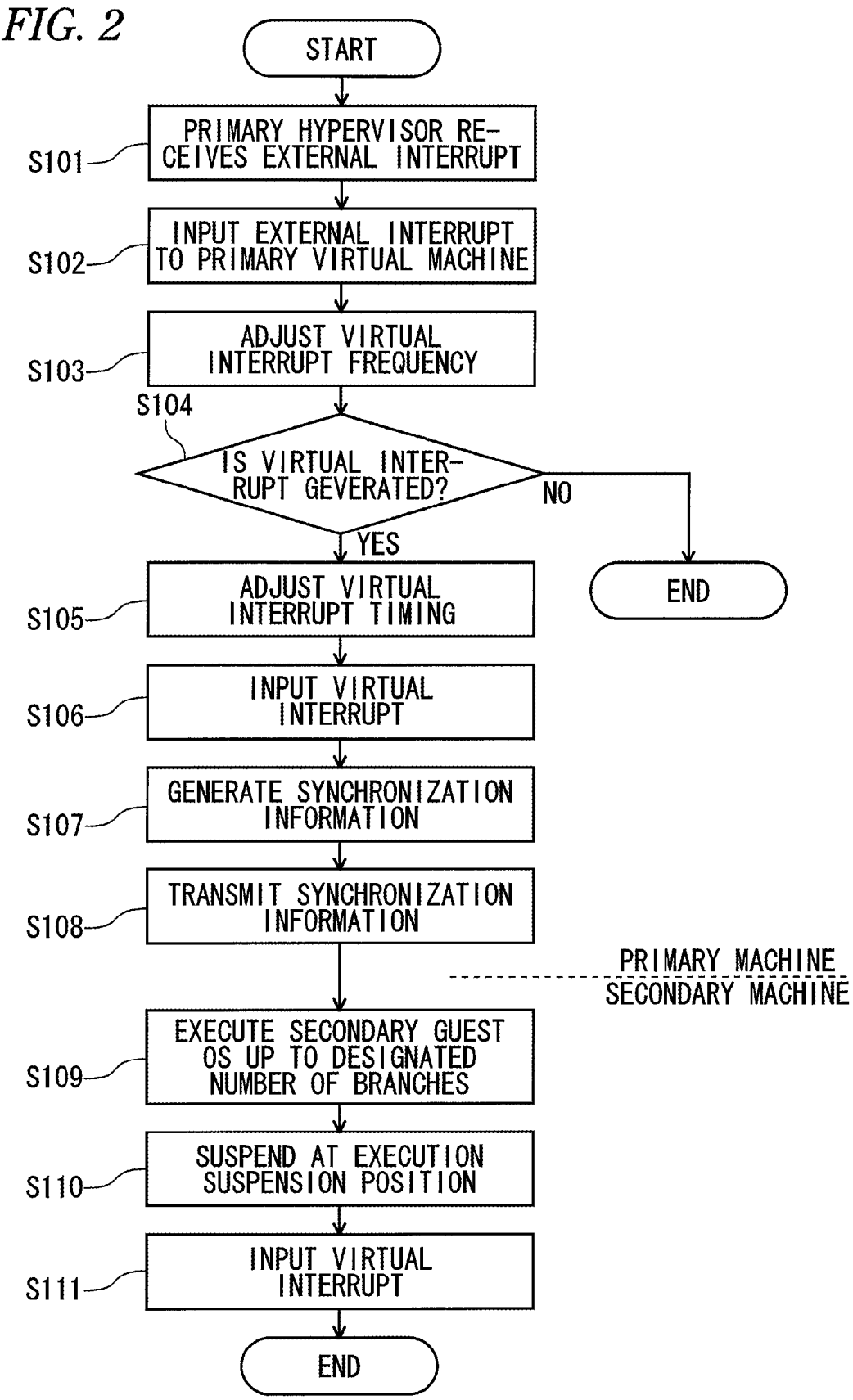
FIG. 2 is a flowchart illustrating an outline of parallel synchronization operation of a primary virtual machine and a secondary virtual machine.

Returning to the description of FIG. 2, the primary virtual machine 130 generates the synchronization info nation including the identification info nation on the virtual interrupt and the synchronization timing information, and then transfers the synchronization information to the secondary virtual machine 230 (S108).

In order to suspend the execution of the secondary guest OS 240 according to the synchronization timing information, in the secondary virtual machine 230 that received the synchronization information, the designated branch number execution unit 232 first counts the number of branches when the secondary guest OS 240 is executed. When the count number of branches reaches a value indicated by the number of branches in the synchronization timing information, the secondary virtual machine 230 suspends the secondary guest OS 240. That is, the secondary virtual machine 230 executes the secondary guest OS 240 up to the designated number of branches (S109). For that reason, there is no need to monitor the execution suspension position and the number of CPU execution instructions until the count number of branches reaches the designated number of branches, and the processing load is reduced. The details of the designated branch number executing operation executed by the designated branch number execution unit 232 will be described later.

The designated position context switching unit 233 suspends the execution of the secondary guest OS 240 at a position indicated by the execution suspension position of the synchronization timing information (S110).

In suspending the execution of the secondary guest OS 240, if the technique in which the break instruction is embedded to configure the break point as in the conventional system is used, when the guest OS (140, 240) or the application (150, 250) are debugged on the virtual machines (130, 230), the suspension interferes with the break point of debug, and the mutual processing is adversely affected. Because there may be a situation where a user wants to examine the application (150, 250) operation on the virtual machines (130, 230) being synchronized with each other, it is desirable to avoid an interference of the break point.

Also, in the CPU having no virtualization supporting function, the processing cannot be transitioned from the secondary guest OS 240 to the secondary virtual machine 230 by setting the break point.

Under the circumstance, in the fault tolerant system 10 according to this embodiment, the designated position context switching unit 233 executes the context switching without the use of the break instruction to suspend the execution of the secondary guest OS 240. The details of the designated position context switching operation executed by the designated position context switching unit 233 will be described later.

When the secondary virtual machine 230 suspends the secondary guest OS 240, the secondary virtual machine 230 configures the virtual interrupt according to the virtual interrupt identification information on the synchronization information to restart the secondary guest OS 240. As a result, the virtual interrupt is input to the secondary guest OS 240 at the same timing as that of the primary guest OS 140 (S111), and the execution states of the primary virtual machine 130 and the secondary virtual machine 230 are synchronized with each other.

If a hardware failure occurs in one of the primary machine 100 and the secondary machine 200, the execution states become out of synchronization. In this embodiment, the execution states can be accurately synchronized with each other without being affected by the count omission of the performance counter. For that reason, if the hardware is normal, the synchronization of the execution states is not disturbed. As a result, the disturbance of the synchronization of the execution states is detected, thereby being capable of detecting the hardware failure.

Since the conventional system cannot determine whether the disturbance of the synchronization of the execution states is derived from the hardware failure, or an influence of the counter omission of the number of execution instructions, there is a need to check the output data. On the other hand, in the fault tolerant system 10 according to this embodiment, because the hardware failure can be detected by the disturbance of the synchronization of the execution states, there is no need to check the output data for detection of the failure. As a result, a CPU processing load and a communication load for checking the output data can be reduced. Also, the occurrence of the hardware failure can be immediately detected.

The detection of the disturbance of the synchronization of the execution states may be determined by detecting the disturbance of the synchronization when the number of branches exceeds the number of times designated in the synchronization timing information before the execution suspension position designated by the synchronization timing information is executed, for example, in the virtual interrupt input conversion unit 231 of the secondary virtual machine 230.

(Details of Operation of Respective Blocks)

Subsequently, the operation of the respective blocks in the fault tolerant system 10 will be described in detail with reference to a first embodiment, a second embodiment, and a third embodiment.

In the conventional fault tolerant system, it is assumed that the CPU of the primary machine and the CPU of the secondary machine have the same architecture. This is because the conventional synchronizing technique depends on the CPU architecture and the CPU operation specification, and if the type of CPU is different, both of the execution instructions cannot be synchronized with each other, and may be out of synchronization.

On the other hand, as described in the first embodiment and the second embodiment, the system according to the embodiments may not only be applied to a case in which the CPU 111 of the primary machine 100 and the CPU 211 of the secondary machine 200 have the same architecture, but also to a case in which the architecture is different.

In general, when the fault tolerant system is operated for a long period of term, the device is forced to be replaced with a fresh one due to a failure or the aged deterioration. In this situation, it is difficult to prepare a device having the same specification as that of a previous device. For that reason, the fault tolerant system 10 according to this embodiment has a structure capable of continuing the parallel synchronization operation even if the CPU architecture is different.

First Embodiment

As a first embodiment, the operation for a case where the CPU 111 of the primary machine 100 and the CPU 211 of the secondary machine 200 have the same architecture will be described. In the present specification, the same CPU architecture means that a CPU instruction set has compatibility between the two processors.

In this case, the primary virtual machine 130 and the secondary virtual machine 230 execute the parallel synchronization operation by synchronizing CPU instruction levels. For that reason, in both of the virtual machines (130, 230), the programs of the guest OS (140, 240) and the applications (150, 250) have a code format compiled to a native CPU instruction code with respect to the CPU (111, 211) as usual. It is assumed that this parallel synchronization operation is called "CPU instruction synchronization mode".
(Interrupt Frequency Adjusting Operation)

First, interrupt frequency adjusting operation (S103) executed by the interrupt frequency adjustment unit 132 will be described. The interrupt frequency adjustment unit 132 of the primary virtual machine 130 does not input the virtual interrupt for all of the external interrupt, but adjusts the frequency of the virtual interrupt to the extent that fulfills a performance and a precision required by the application 150, and an allowable communication delay.

In general, the external interrupt may be categorized into a fixed period interrupt using the timer 113 and an unfixed period interrupt using the network interface card (NIC) 114 or the devices 115. The interrupt frequency adjustment unit 132 executes the adjustment of frequency according to the fixed period interrupt and the unfixed period interrupt, separately.

In the external interrupt of the fixed period, the virtual interrupt is input to the primary guest OS 140 at the rate of once per several external interrupt of the fixed period by omitting some of the external interrupts.

For example, when the timer interrupt of the fixed period is input to the primary guest OS 140 whereby the primary guest OS 140 can count an accurate time. However, if a precision of the time required by the application 150 is not high, some of the input of the timer interrupt may be omitted without any problem.

For example, when a period of the timer interrupt from the primary hypervisor 120 is 1 ms, and the precision of the time required in the application 150 is 100 ms, the precision of 100 ms can be maintained even if the period of the virtual interrupt is thinned to 10 ms. In this situation, because the frequency of the virtual interrupt is reduced to $1/10$, the synchronization processing of the execution states is also reduced to $1/10$.

The thinning rate may be set in advance according to a requested precision of the application 150, or may be adjusted by parameters. Also, the thinning rate may be set uniformly with respect to the external interrupt of the fixed period, or the thinning rate may be set for each factor of the external interrupt of the fixed period.

In the external interrupt of the unfixed period, the virtual interrupt is omitted with respect to the external interrupt input during the processing, and only the last external interrupt whose processing has been completed is input to the primary guest OS 140 as the virtual interrupt.

For example, an interrupt of reception of the network from the NIC 114 occurs every time data arrives at the NIC 114. For that reason, plural external interrupt occurs during receiving the data as a significant unit. Conventionally, the virtual interrupt is input to the primary guest OS 140 every time the external interrupt occurs so that the received data is transferred from the NIC 114 to the primary guest OS 140. On the other hand, the interrupt frequency adjustment unit 132 omits the virtual interrupt with respect to the external interrupt during receiving data, and inputs the virtual interrupt to the primary guest OS 140 with respect to one external interrupt after the data is received. As a result, the number of synchronization processing of the execution states may be reduced, and data of a large size can be processed at a time.

As the external interrupt of the unfixed period which is applicable to this technique, there are transmission/reception interrupt of the network, read/write interrupt of a storage, transmission/reception interrupt of a serial communication, and read/write interrupt of various I/O devices such as an analog/digital I/O board.
(Virtual Interrupt Timing Adjusting Operation)

Subsequently, the virtual interrupt timing adjusting operation (S105) executed by the interrupt timing adjustment unit 133 will be described. The virtual interrupt timing adjustment is configured to input the virtual interrupt with the avoidance of the critical section of the primary guest OS 140 so that the secondary guest OS 240 is suspended at the same position.

The virtual interrupt timing adjusting operation is different in the processing between a case in which the detail of the CPU architecture is known, and a case in which the detail of the CPU architecture is unknown. The case in which the detail of the CPU architecture is known represents a case in which whether the suspension position is in the critical section or not is determined according to a CPU instruction or a state flag of the suspension position.

First, a specific operation procedure when the details of the CPU architecture are known will be described with reference to a flowchart of FIG. 4.

Upon receiving an input of the external interrupt from the primary hypervisor 120 (S201), the primary virtual machine 130 waits for the suspension of execution of the primary guest OS 140 (S202).

When the execution of the primary guest OS 140 is suspended, and the processing is transitioned to the primary virtual machine 130, the primary virtual machine 130 acquires a state of the primary virtual machine 130 (S203). The state to be acquired is information for determining whether the suspension position is in the critical section or not, which is, for example, configuration information of an interrupt mask of the CPU 111, or the contents of a flag register.

Then, it is determined whether the suspension position is in the critical section or not based on the acquired information (S204). For example, it can be determined that the suspension position is not in the critical section for the reasons that the input of interrupt is not inhibited in the interrupt mask, and a flag that disables the configuration of the break instruction is not configured in the flag register.

If the suspension position is not in the critical section (no in S204), the suspension position is configured as an input timing of the virtual interrupt (S205).

If the suspension position is in the critical section (yes in S204), the execution of the primary guest OS 140 is advanced while confirming the state of the primary virtual machine 130 (S206). In this situation, for example, the step execution is performed to confirm the state for each of the instructions (S203). Then, it is determined whether the suspension position is in the critical section, or not (S204), and the suspension position gets out of the critical section (no in S204). Then, the suspension position is configured to the input timing of the virtual interrupt (S205).

Figure 5:
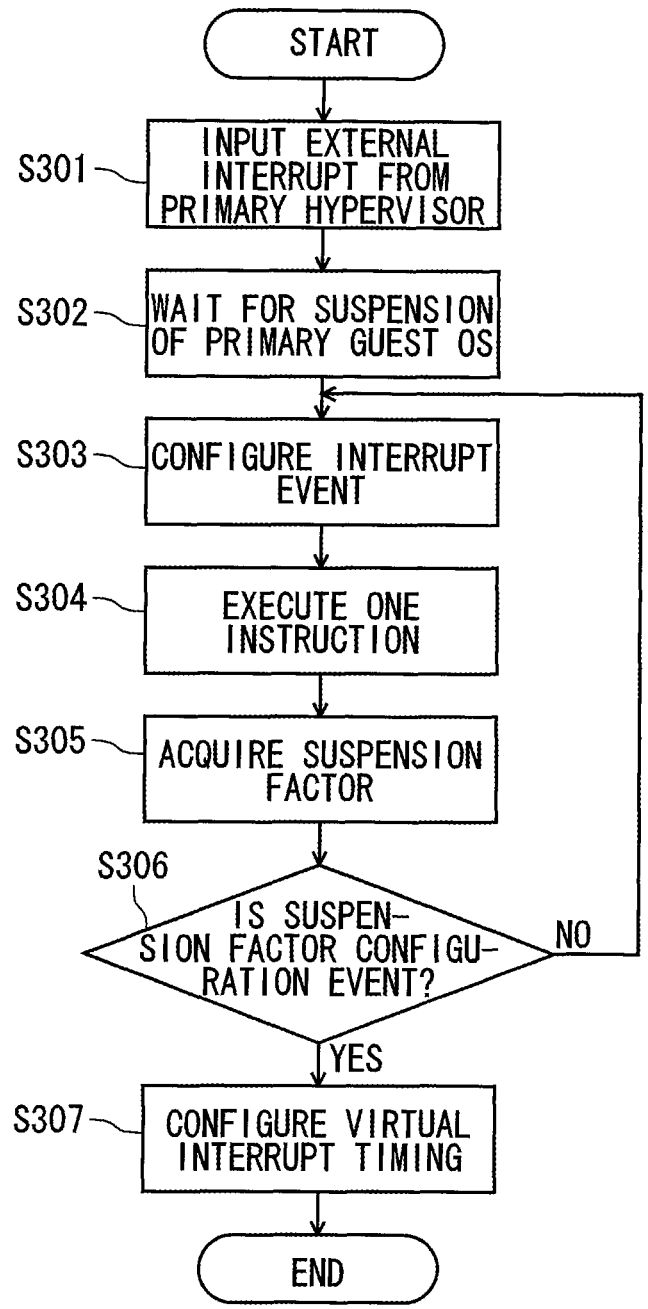
FIG. 5 is a flowchart illustrating a specific procedure of virtual interrupt timing adjustment operation when the detail of a CPU architecture is unknown.
Figure 6:
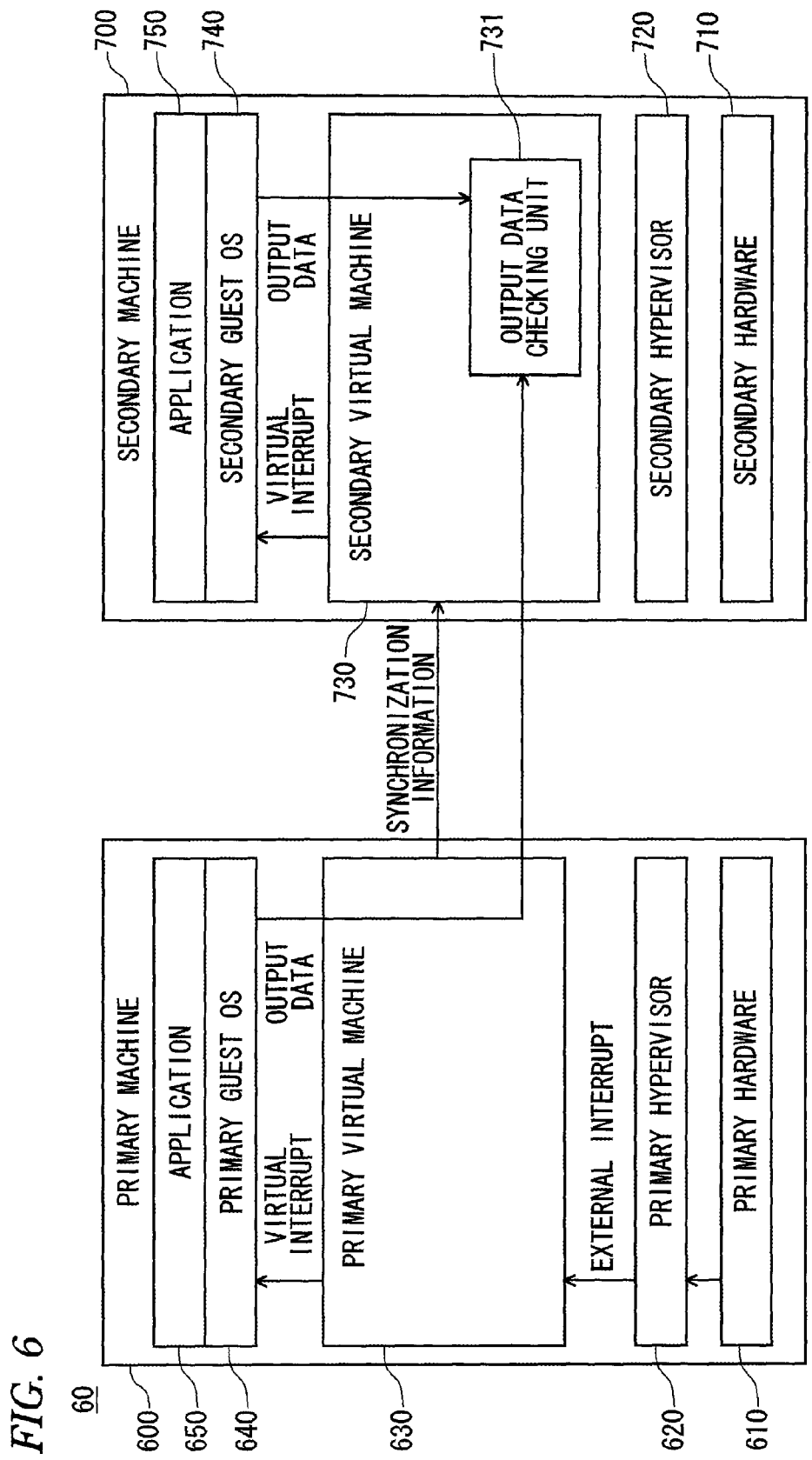
FIG. 6 is a block diagram illustrating a configuration of a related art fault tolerant system using virtual machines.
Figure 7:
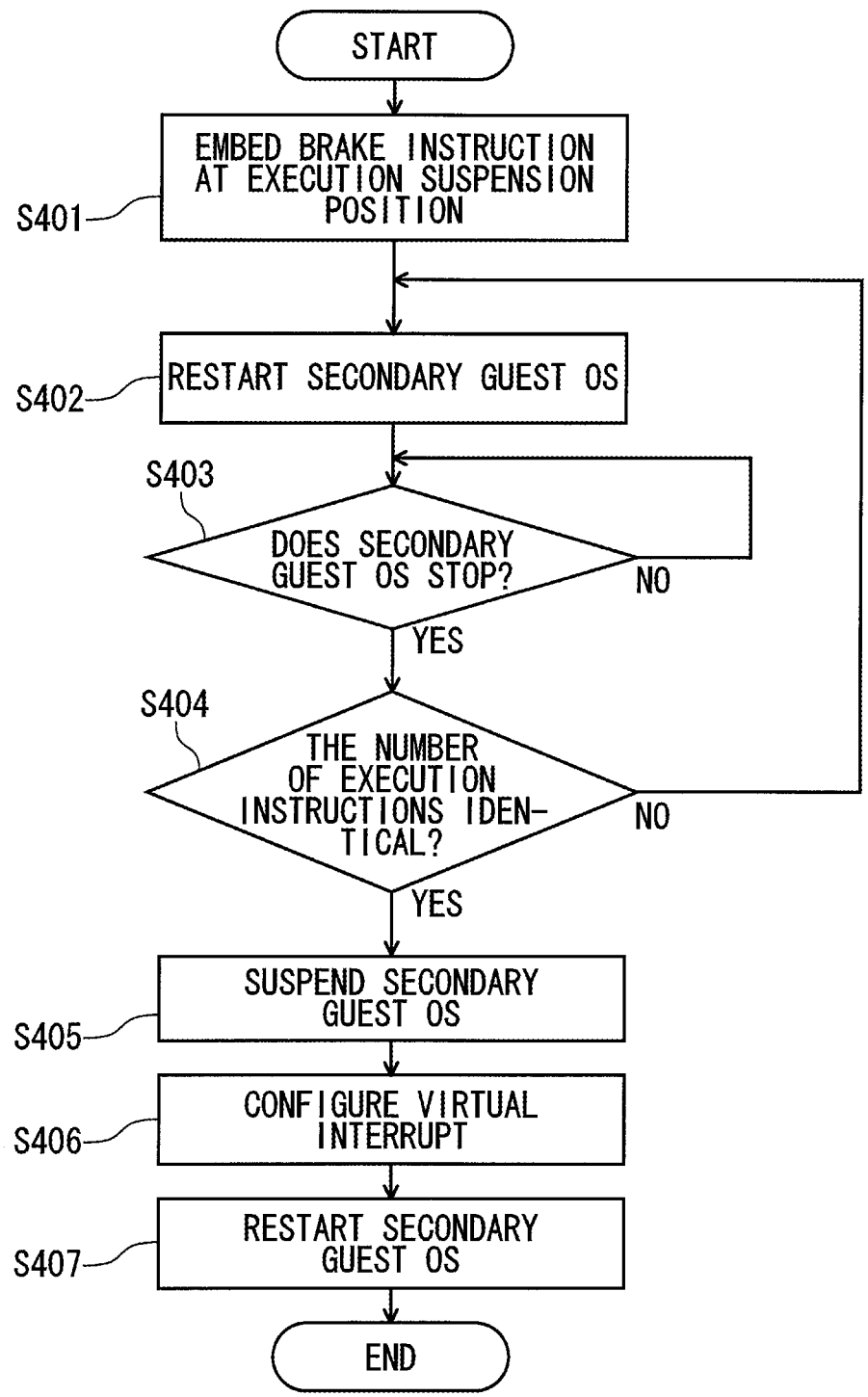
FIG. 7 is a flowchart illustrating the operation of allowing a secondary virtual machine that has received synchronization information to suspend the execution of a secondary guest OS according to synchronization timing information.

Subsequently, a specific operation procedure when the detail of the CPU architecture is unknown will be described with reference to a flowchart of FIG. 5. If the detail of the CPU architecture is unknown, even if the state of the primary virtual machine 130 is acquired, it cannot be determined whether the suspension position is in the critical section or not. Therefore, an event for suspension is configured, and a position at which the suspension can be actually made is set as the suspension position for inputting the virtual interrupt.

Upon receiving an input of the external interrupt from the primary hypervisor 120 (S301), the primary virtual machine 130 waits for the suspension of the execution of the primary guest OS 140 (S302).

Then the execution of the primary guest OS 140 is suspended, and the processing is transitioned to the primary virtual machine 130, the primary virtual machine 130 configures an event that the suspension is made after a given number of instructions is executed, for example, after one instruction is executed (S303) in the primary guest OS 140.

Then, the execution of the primary guest OS 140 is restarted by step execution (S304), a factor of the suspension is acquired for execution of one instruction (S305). This is because the factor of the suspension is not always caused by the configured suspension event.

If the factor of the suspension is caused by the configured suspension event (yes in S306), it is determined that the suspension position is not in the critical section and that the secondary guest OS 240 is suspendable at the same position, and the suspension position is configured to the input timing of the virtual interrupt (S307).

If the factor of the suspension is not caused by the configured suspension interrupt event (no in S306), it is determined that the suspension position is in the critical section and that the secondary guest OS 240 is unable to be suspended at the same position. Then, an event that the primary guest OS 140 is suspended after one instruction is executed is configured (S303), and the processing after the execution of the primary guest OS 140 is restarted (S304) is repeated. If the process is advanced beyond the critical section (yes in S306), the suspension position is configured to the input timing of the virtual interrupt (S307).

(Synchronization Information Generating Operation)

Subsequently, the operation (S107) of generating the synchronization information conducted by the synchronization information generation unit 135 will be described. If the CPU 111 of the primary machine 100 and the CPU 211 of the secondary machine 200 have the same architecture, the execution suspension position in the synchronization timing information of the synchronization information is indicated by an execution stop position of the CPU instruction code, and a program counter value may be used.

The number of branch execution in the synchronization timing information is indicated by the number of branches executed by the primary guest OS 140 from the previous synchronization timing information generation time. The number of branches may be obtained by counting the branch instruction executed at the CPU instruction code level.

(Designated Branch Number Executing Operation)

Subsequently, the designated branch number executing operation (S109) executed by the designated branch number execution unit 232 will be described. The designated branch number executing operation is configured to suspend the secondary guest OS 240 by the number of times indicated by the number of branches in the synchronization timing information.

The designated branch number execution unit 232 counts the branch instructions executed at the CPU instruction code level. If the count value reaches a designated number of branches, the designated branch number execution unit 232 notifies the secondary virtual machine 230 of this fact. As a result, the context is switched to the secondary virtual machine 230, and the execution of the secondary guest OS 240 is suspended.

In the CPU architecture that may not be able to stop immediately after the designated number of branches is executed due to speed-up of a pipeline function of the CPU 211, the count value is set to a value smaller than the designated number of branches so that the secondary guest OS 240 may be able to be suspended by the designated number of branches.

(Designated Position Context Switching Operation)

Subsequently, the designated position context switching operation (S110) conducted by the designated position context switching unit 233 will be described. The designated position context switching operation is configured to switch a context to the secondary virtual machine 230 at the designated execution suspension position with the use of no break instruction after the secondary guest OS 240 is suspended by the designated number of branches.

When a dedicated context switching instruction is implemented for the secondary virtual machine 230, the context switching instruction is embedded at the execution suspension position of the secondary guest OS 240. The context switching instruction may be, for example, a VMCALL instruction of a CPU made by Intel Corporation.

When the secondary guest OS 240 executes the context switching instruction, the context is switched from the secondary guest OS 240 to the secondary virtual machine 230, and the execution of the secondary guest OS 240 is suspended.

When the dedicated context switching instruction is not implemented, the virtual interrupt or an event of the CPU exception is made to occur at the execution suspension position so that the context switching is executed. When the context switching is executed, the context is switched from the secondary guest OS 240 to the secondary virtual machine 230, and the execution of the secondary guest OS 240 is suspended.

In any cases, when the execution of the secondary guest OS 240 is suspended, the secondary virtual machine 230 configures the virtual interrupt, and restarts the execution of the secondary guest OS 240, and at that timing, the virtual interrupt is input to the secondary guest OS 240.

Second Embodiment

As a second embodiment, the operation when the CPU 111 of the primary machine 100 and the CPU 211 of the secondary machine 200 have the different architectures will be described. In the present specification, a different CPU architecture means that a CPU instruction set has no compatibility between the two processors.

In this case, the primary virtual machine 130 and the secondary virtual machine 230 execute the parallel synchronization operation by synchronizing intermediate language levels. In the present specification, "intermediate language" is also called "intermediate code", or "byte code", and represents a language of intermediate representation which is intermediate between a source code of a high-level language and a code of a machine language. The parallel synchronization operation is called "intermediate language synchronization mode".

Because the CPU instruction set has no compatibility between both of the virtual machines (130, 230), the programs of the guest OS (140, 240) and the applications (150, 250) are a program of the intermediate language in which Java (registered trademark) and C# are converted instead of the native CPU instruction code.

Both of the virtual machines (130, 230) convert the intermediate language into the native CPU instruction for the virtual machine CPUs through an existing CPU instruction conversion technique such as an interpreter or a just-in-time compiler (JIT compiler).

Similarly, when the CPU 111 of the primary machine 100 and the CPU 211 of the secondary machine 200 have the same architecture, the parallel synchronization operation using an intermediate language synchronization mode may be executed. However, the parallel synchronization operation using a CPU instruction synchronization mode is higher in the execution speed than that of the inter mediate language synchronization mode.

Subsequently, the operation of the respective blocks according to the second embodiment will be described. Since most of the operation is identical with that of the CPU instruction synchronization mode in the first embodiment, only the processing different from that of the first embodiment will be described.

(Virtual Interrupt Timing Adjustment Operation)

In the CPU instruction synchronization mode according to the first embodiment, the virtual interrupt timing adjustment operation (S105) is different in the processing between the case in which the detail of the CPU architecture is known, and the case in which the details of the CPU architecture is unknown. On the other hand, in the intermediate language synchronization mode according to the second embodiment, the same processing as that when the detail of the CPU architecture is known is executed.

Figure 4:
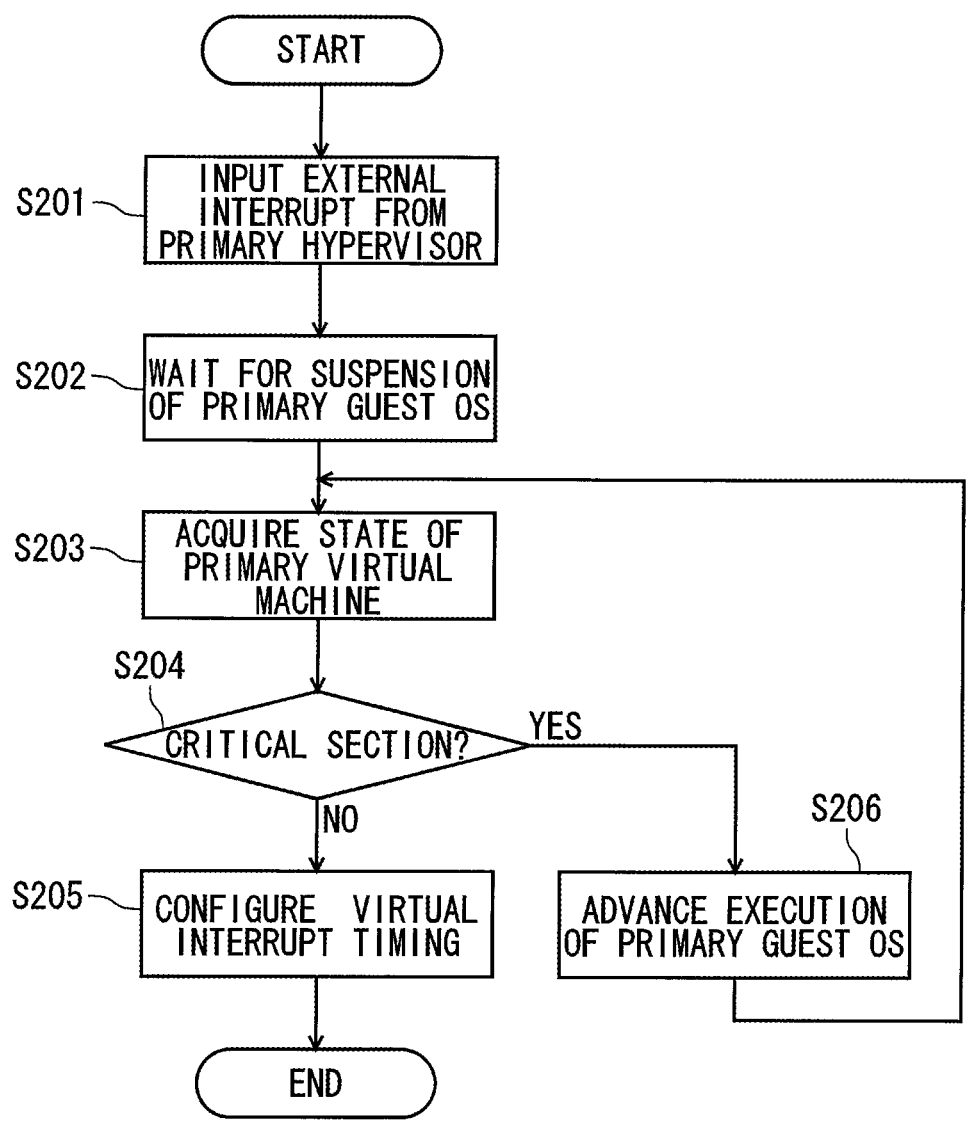
FIG. 4 is a flowchart illustrating a specific procedure of virtual interrupt timing adjustment operation when the detail of a CPU architecture is known.

That is, since whether the suspension position is in the critical section or not may be determined according to the CPU instruction or a state flag of the suspension position, the suspension position of the primary guest OS 140 is configured with the avoidance of the critical section according to a flowchart illustrated in FIG. 4, and the virtual interrupt is input to the primary guest OS 140.

Also, in the intermediate language synchronization mode, it can be determined whether the suspension position is in the critical section, or not, at the intermediate language level in addition to the CPU instruction and the state flag of the suspension position. For example, if the intermediate language is a byte code of Java (registered trademark), it is assumed that the critical section is implemented under a synchronized exclusive control. For that reason, with the confirmation of the instruction of the executed intermediate language, the primary virtual machine 130 is able to determine whether the intermediate language of the suspended Java (registered trademark) is in the critical section or not.

(Generating Operation of Synchronization Information)

In the CPU instruction synchronization mode according to the first embodiment, in the generating operation of the synchronization information (S107), the execution suspension position included in the synchronization timing information is indicated by the execution stop position of the CPU instruction code with the use of the program counter value. Also, the number of branch executions included in the synchronization timing information is indicated by the number of branches of the CPU instruction code executed from the previous synchronization timing information generation time.

On the contrary, in the intermediate language synchronization mode according to the second embodiment, the execution suspension position is indicated by the execution suspension position of the intermediate language level executed at the time of inputting the virtual interrupt. Also, the number of branch executions is represented by the number of branches of the intermediate language level executed from the previous synchronization timing information generation time.

(Designated Position Context Switching Operation)

In the CPU instruction synchronization mode according to the first embodiment, in the designated position context switching operation (S110), when a dedicated context switching instruction is implemented for the secondary virtual machine 230, the context switching instruction is embedded at the execution suspension position of the secondary guest OS 240. When the dedicated context switching instruction is not implemented, the virtual interrupt or the event of the CPU exception is made to occur at the execution suspension position so that the context switching is executed. Even in the intermediate language synchronization mode according to the second embodiment, the same configuration is conducted by the CPU instruction conversion at the execution suspension position of the intermediate language level.

Third Embodiment

Subsequently, as a third embodiment, the parallel synchronization operation when the hardware configuration is different between the primary machine 100 and the secondary machine 200 will be described. The primary hardware 110 of the primary machine 100 and the secondary hardware 210 of the secondary machine 200 are each configured by a variety of hardware devices such as a CPU (111, 211), a memory (112, 212), a device (115, 215) such as storage.

However, the functions or the performances of both the hardware may not be the same with each other.

For example, there may be a case where the specification of the CPUs (111, 211) is different from each other, or the capacity of the memories (112, 212) is different from each other. Also, in the operation process of the fault tolerant system 10, both of the devices (115, 215) are different due to the replacement of the devices (115, 215).

For that reason, the primary virtual machine 130 and the secondary virtual machine 230 are identical in the operation, but may be different in the processing speed. As described above, in the fault tolerant system 10, the primary virtual machine 130 is configured to operate ahead of the secondary virtual machine 230. However, for example, if the secondary virtual machine 230 is higher in the processing speed, the advancement of a process may be inverted, and the execution states are not synchronized based on the synchronization information from the primary virtual machine 130. If the primary virtual machine 130 is higher in the processing speed, a delay of the secondary virtual machine 230 may be accumulated.

Also, execution of driver processing may be different between the primary guest OS 140 and the secondary guest OS 240 due to the different devices (115, 215), and the operation is different therebetween, as a result of which the operation may be out of synchronization.

Under the circumstances, in the fault tolerant system 10, there is provided a structure for correcting the processing speed difference and out-of-synchronization based on the difference between the primary hardware 110 and the secondary hardware 210. Specifically, the synchronization information generation unit 135 of the primary virtual machine 130 and the synchronization correction unit 235 of the secondary virtual machine 230 execute the synchronization correction. The synchronization correction may be execute before executing the parallel synchronization operation, or may be executed during the execution of the parallel synchronization operation.

(Synchronization Correcting Operation before Execution of the Parallel Synchronization Operation)

The synchronization information generation unit 135 of the primary virtual machine 130 collects the operation performance information on the secondary virtual machine 230 from the secondary virtual machine 230 prior to the parallel synchronization operation of the primary virtual machine 130 and the secondary virtual machine 230.

The operation performance information is information including the operation specification of an interface with the secondary guest OS 240 in the secondary virtual machine 230, and benchmark information which is an index of a program execution speed of the secondary virtual machine 230. The synchronization information generation unit 135 is configured to acquire the operation performance information on a plurality of items in an available range.

The synchronization information generation unit 135 also acquires the operation performance information on the primary virtual machine 130 per se, and compares the acquired operation performance information with the operation performance information on the secondary virtual machine 230. Then, the synchronization information generation unit 135 sets the operation performances used by the primary virtual machine 130 and the secondary virtual machine 230 so that the operation performance in the parallel synchronization operation of the primary virtual machine 130 becomes substantially equal to the operation performance in the parallel synchronization operation of the secondary virtual machine 230.

The operation performance is benchmark information on, for example, operating frequency, a memory size, a cache size, the operation specification such as TLB (translation look-aside buffer)/EPT (enhanced page table) specification, an MIPS value, or a SPEC value. In the intermediate language synchronization mode, the benchmark value of the intermediate language can be used. For example, when a byte code of Java (registered trademark) is used as the intermediate language, SPECjbb, CaffeineMark, and so on are recited as the benchmark value.

Then, the synchronization information generation unit 135 notifies the synchronization correction unit 235 of the secondary virtual machine 230 of the operation performance used by the secondary virtual machine 230 as the synchronization correction information. The synchronization correction unit 235 of the secondary virtual machine 230 sets the operation performance of the secondary virtual machine 230 at the time of executing the parallel operation according to the notified synchronization correction information.

An example of synchronization correction by adjusting the operation frequency will be described. As described above, when the hardware configuration is different between the primary machine 100 and the secondary machine 200, there is a case in which the operation is identical, but the processing speed is different, and a case in which the operation per se is different. In this example, the synchronization correction when the operation is identical, but the processing speed is different will be described.

In adjustment of the operating frequency of the virtual machines (130, 230), a power control function prepared for power saving may be used. For example, an ACPI (advanced configuration and power interface) may be used for a standard power control function, and a cpufreq subsystem of Linux (registered trademark) may be used for a function of adjusting the operating frequency. With the use of those functions, both of the virtual machines (130, 230) are prepared to have a plurality of available operating frequencies.

The synchronization information generation unit 135 of the primary virtual machine 130 acquires a list of the operating frequencies that are available in the secondary virtual machine 230 from the secondary virtual machine 230, also acquires a list of the operating frequencies that are available by the primary virtual machine 130 per se, and selects the operating frequency substantially identical between the secondary virtual machine 230 and the primary virtual machine 130. The synchronization information generation unit 135 notifies the synchronization correction unit 235 of the secondary virtual machine 230 of the selected operating frequency as the synchronization correction information.

During the parallel synchronization operation of the primary virtual machine 130 and the secondary virtual machine 230, the respective virtual machines (130, 230) operate at the selected operating frequency to eliminate the processing speed difference based on the difference in the operating frequency between the primary hardware 110 and the secondary hardware 210.

If none of the available operating frequency of the primary virtual machine 130 matches the available operating frequency of the secondary virtual machine 230, for example, the secondary virtual machine 230 is set as the higher operating frequency, and as will be described later, the operation of the secondary virtual machine 230 can be executed with pauses.

In the intermediate language synchronization mode, the processing speed is different between the primary virtual machine 130 and the secondary virtual machine 230 due to a difference of the benchmark value. Accordingly, the same adjustment as that of the operating frequency is executed based on both of the acquired benchmark values to correct the processing speed difference.

Subsequently, a description will be given of the synchronization correction when the operation per se is different between the primary virtual machine 130 and the secondary virtual machine 230 due to a difference in the hardware configuration.

For example, when the CPU architecture is identical, but the operation specification of the devices (115, 215) is different, the execution of the virtual machine is changed so that both of the guest OS (140, 240) execute the same driver processing. With this change, both of the guest OS (140, 240) can execute the same operation, and out-of-synchronization can be prevented. Specifically, a function of absorbing a difference in the operation specification is incorporated into a device emulator of the primary virtual machine 130 or the secondary virtual machine 230 before the parallel synchronization operation starts.

This function can be categorized into the following two types according to an object to be corrected.

(1) Correction to Difference between Presence and Absence of Hardware Function

When a certain hardware function is installed into only one virtual machine (130, 230), the virtual machine (130, 230) having that function does not use the function so that the both of the virtual machines (130, 230) operate in a state where those virtual machines have no hardware function.

For example, if the virtual machines are different in the presence or absence of an FPU (floating point processing unit) function, both of the virtual machines (130, 230) operate in a state where those virtual machines have no FPU function. In this case, the floating point processing is executed by an emulation code within the guest OS (140, 240). Specifically, an exception occurs at the time of executing the floating point processing, and an exception handler of the guest OS (140, 240) acquires this exception, and emulates the processing by software.

Alternatively, the virtual machine (130, 230) having no function may emulate the function by processing of software in an external environment outside of the guest OS (140, 240) to absorb the difference therebetween. The external environment outside of the guest OS (140, 240) may be the virtual machines (130, 230) or the hypervisors (120, 220).

For example, the virtual machine (130, 230) having no FPU function executes the floating point processing by an emulation code within the virtual machines (130, 230). Specifically, switching to the virtual machine context is executed by an exception occurring at the time of executing the floating point processing, the processing is emulated by software within the virtual machines (130, 230), and thereafter the process returns to the guest OS context. Because the exception is not acquired in the guest OS (140, 240), the emulation code within the guest OS (140, 240) is not executed.

(2) Correction to Difference in Performance or Capacity of Hardware Function

When the performance or the capacity of the hardware function is different, the processing different in the operation is executed in the external environment outside of the guest OS (140, 240). The external environment outside of the guest OS (140, 240) may be the virtual machines (130, 230), the hypervisors (120, 220), or hardware (110, 210).

For example, if the cache size of the TLB is different, there is a case in which only one of the virtual machines (130, 230) does not hit the cache, and a TLB miss occurs. Under the circumstances, recovery processing from the TLB miss is executed outside of the guest OS (140, 240). In the CPU made by Intel Corporation, the recovery processing can be executed by the function of hardware. On the other hand, when the CPU (111, 211) has no recovery function of hardware, the recovery processing is executed by the software of the virtual machines (130, 230) or the hypervisors (120, 220).

In the intermediate language synchronization mode, the virtual machines (130, 230) execute a guest OS program expressed by the intermediate language with the use of the software function such as the interpreter on a virtual memory. For that reason, no difference occurs in the operation of the guest OS (140, 240) due to a difference in the operation specification.

(Synchronization Correcting Operation during Execution of Parallel Synchronization Operation)

When the processing speed difference between the primary virtual machine 130 and the secondary virtual machine 230 is unable to be eliminated even by the adjustment before the parallel synchronization operation starts, the synchronization information generation unit 135 and the synchronization correction unit 235 execute the following synchronization correction during the parallel synchronization operation.

First, a description will be given of the synchronization correction when the primary virtual machine 130 after the operation performance is adjusted is higher in speed than the secondary virtual machine 230 after the operation performance is adjusted.

The synchronization information generation unit 135 selects the operation performance of the primary virtual machine 130, or the operation performance of the secondary virtual machine 230, as the operation speed information of the synchronization correction information to be notified to the secondary virtual machine 230. The selection can be conducted, for example, on the basis of the parameter configuration.

If the operation performance of the primary virtual machine 130 is selected, because the preceding operation of the primary virtual machine 130 is enlarged, processing for eliminating a delay of the secondary virtual machine 230 is executed. In this case, if the delay of the secondary virtual machine 230 is larger than an assumed amount, it may be detected that a failure occurs in the machine.

Now, two correction methods will be described as examples of the processing for eliminating the delay. First, a method of resetting the delay and executing resynchronization will be described as a first correction method.

The synchronization correction unit 235 of the secondary virtual machine 230 confirms whether a measured delay time of the execution speed of a program in the secondary virtual machine 230 is equal to an assumed delay time obtained from the synchronization correction information or not.

Now, the measured delay time will be described. The secondary virtual machine 230 receives the synchronization timing information of the fixed period virtual interrupt using the timer from the primary virtual machine 130. The synchronization timing information represents a period time obtained by converting the execution speed of the primary virtual machine 130 into the number of execution instructions, which is a theoretical value for the secondary virtual machine 230. On the other hand, a period time when the fixed period interrupt using the timer occurs in the secondary virtual machine 230 is a measured value. A value obtained by subtracting the theoretical value from the measured value is a measured delay time.

For example, when a period value of the timer interrupt actually occurring in the primary virtual machine 130 is 10 ms, if the secondary virtual machine 230 receives the virtual interrupt after the same operation as that of the primary virtual machine 130 is executed, it is assumed that the measured value of the period of the timer interrupt in the secondary virtual machine 230 is 15 ms. In this case, because the theoretical value is 10 ms, and the measured value is 15 ms, it is calculated that the timer interrupt has a delay of 5 ms.

If the measured delay time is comparable with the assumed delay time obtained from the synchronization correction information, it is determined as a normal delay, and the processing is continued. Because the measured delay time is accumulated with the continuation of the processing, a allowable delay time which is an allowable range is set in advance, and the same synchronization initializing process as that when the parallel synchronization operation starts is again executed at a point when the measured delay time exceeds the allowable delay time to reset the delay.

For example, when a program execution speed of the primary virtual machine 130 is 1500 MIPS (million instructions per second), and a program execution speed of the secondary virtual machine 230 is 1000 MIPS, if a delay occurs in the secondary virtual machine 230 by a time necessary for processing 500 MI (5 hundred million instructions) per second, it is determined as the normal delay. Also, a time for processing 5000 MI (50 hundred million instructions) accumulated continuously for 10 seconds corresponds to 5 seconds in the secondary virtual machine 230, and if the time exceeds the allowable delay time, resynchronization is executed to reset the delay.

Subsequently, a description will be given of a method of advancing a certain time to overcome the delay as a second correction method. In this method, when the primary guest OS 140 becomes in an idle state, and the operation stops until a subsequent virtual interrupt is input to the primary guest OS 140, that is, when a load of the CPU processing is smaller than 100%, a time when the secondary guest OS 240 restarts is advanced to overcome the delay.

The idle state of the primary guest OS 140 represents a state in which there is no process to be executed, and the operation of the primary guest OS 140 stops. The primary guest OS 140 does not restart the operation until the virtual interrupt is input to execute the handler processing. Up to then, the primary virtual machine 130 waits for input of the external interrupt.

The primary virtual machine 130 continuously waits for actual input of the external interrupt, and the secondary virtual machine 230 continuously waits for reception of the synchronization information for inputting the virtual interrupt.

When the secondary virtual machine 230 is delayed, because the synchronization information is accumulated, the virtual interrupt to be next input can be known. For that reason, the secondary virtual machine 230 does not need to wait the same time as that of the primary virtual machine 130, and can advance the time for restarting the secondary guest OS 240, and input the virtual interrupt.

For example, as in the first correction method, it is assumed that the program execution speed of the primary virtual machine 130 is 1500 MIPS, and the program execution speed of the secondary virtual machine 230 is 1000 MIPS. When the CPU load of the primary guest OS 140 is 20%, the processing of 300 MI per second is executed, the primary virtual machine 130 is stopped for the remaining time of one second. The stop time of the primary virtual machine 130 is a time duration when the primary virtual machine 130 executes the processing of 1200 MI.

On the other hand, the secondary virtual machine 230 does not stop a time duration for executing the processing of 1200 MI identical with that of the primary virtual machine 130 after the secondary virtual machine 230 has executed the processing of 300 MI identical with that of the primary virtual machine 130 for one second, but stops the remaining time of one second, that is, a time duration when the secondary virtual machine 230 executes the processing of 700 MI. Thus, the stop time of the secondary virtual machine 230 is reduced to 700 MI processing time from 1200 MI, thereby being capable of overcoming the delay of the secondary virtual machine 230.

Subsequently, a description will be given of a case in which when the primary virtual machine 130 is higher in speed than the secondary virtual machine 230, the operation performance of the secondary virtual machine 230 is provided as the operation speed information of the synchronization correction information notified to the secondary virtual machine 230.

In this case, because the primary virtual machine 130 runs with the operation performance of the secondary virtual machine 230, the synchronization information generation unit 135 of the primary virtual machine 130 executes the synchronization correction processing during the parallel synchronization operation to adjust the program execution speed. Specifically, the primary virtual machine 130 executes the operation with pauses in conformity to the program execution speed of the secondary virtual machine 230.

Subsequently, a description will be given of the synchronization correction when the secondary virtual machine 230 after the operation performance is adjusted is higher in speed than the primary virtual machine 130 after the operation performance is adjusted. The synchronization information generation unit 135 sets the operation speed information of the synchronization correction information to be notified the secondary virtual machine 230 of as the operation performance of the primary virtual machine 130.

Then, the primary virtual machine 130 does not execute the synchronization correction processing during the parallel synchronization operation, and the secondary virtual machine 230 executes the operation with pauses in conformity to the program execution speed of the primary virtual machine 130.

For example, when the program execution speed of the primary virtual machine 130 is 1000 MIPS, and the program execution speed of the secondary virtual machine 230 is 1500 MIPS, the secondary virtual machine 230 executes the processing of 1000 MI and thereafter executes the pauses of the time duration for executing the processing of 500 MI every virtual interrupt of the fixed period. As a result, both of the virtual machines (130, 230) can equally execute the processing of 1000 MIPS.

(Treatment for Storage Device having Uncertain Access Time)

When the virtual machines (130, 230) access to the storage devices (115, 215) such as a magnetic disc, an SSD, a CD, a DVD, or a tape, there is a variation in a completion wait time to an access request due to an individual difference or the aged deterioration of the storage devices (115, 215). In order to prevent out-of-synchronization caused by the variation, there is a need to suit to a late completion wait time, and synchronization wait occurs, thereby leading to a reduction in the execution speed.

In the fault tolerant system 10 according to this embodiment, when the devices (115, 215) are storage devices, the virtual machines (130, 230) emulate the devices (115, 215) on the memory, and replace an access to the devices (115, 215) with a memory access, thereby being capable of reducing the wait time of completion to the read/write request to the devices (115, 215) to zero.

In this case, the completion interrupt to the read/write request to the devices (115, 215) does not need to wait for the actual completion interrupt, but inputs the virtual interrupt to the guest OS (140, 240) together with the memory access when making a request, thereby being capable of processing the read/write request and completion virtual interrupt at a common synchronization timing. As a result, the synchronization processing of the virtual interrupt due to the completion interrupt becomes unnecessary, the processing load is reduced, and a reduction in the execution speed due to the synchronization wait may be prevented.

A change in the contents of the devices (115, 215) emulated on the memory is reflected on the devices (115, 215) asynchronously with an access from the guest OS (140, 240). In a coping method, the processing may be different depending on a location where the memory is allocated.

(1) A case in which memories within the virtual machines (130, 230) are allocated:

The virtual machines (130, 230) load the contents of the storage devices (115, 215) on a memory allocated to the virtual machines (130, 230), and replaces the access to the storage with the memory access. This memory is called "virtual storage". When the contents of the virtual storage are updated, the virtual machines (130, 230) reflect the change of the contents on the storage devices (115, 215) asynchronously with the access from the guest OS (140, 240).

Specifically, data is read and written in the following procedure. First, as initialization of the virtual storage, the contents of the storage devices (115, 215) are loaded on the memories allocated to the virtual machines (130, 230) in advance.

In the data read, when the guest OS (140, 240) request the virtual storages to read data, the virtual machines (130, 230) notify the guest OS (140, 240) of the contents on the virtual storages, and input the virtual interrupt of read completion to the guest OS (140, 240).

In the data write, when the guest OS (140, 240) request the virtual storages to write data, the virtual machines (130, 230) write data in the virtual storages, and input the virtual interrupt of write completion to the guest OS (140, 240). Then, the virtual machines (130, 230) write a changed portion of the virtual storages into the storage devices (115, 215) asynchronously. After the completion of writing the data into the storage devices (115, 215), the external interrupt of the completion is input to the virtual machines (130, 230). However, there is no need to generate the virtual interrupt based on the external interrupt of the completion.

(2) A case in which memories within the guest OS (140, 240) are allocated:

When the guest OS (140, 240) can use a RAM (Random Access Memory) disk, the RAM disk configured in the guest OS (140, 240) is used for emulation of the storage devices (115, 215). The RAM disk is a device in which the wait time for read and write is zero, and no completion interrupt occurs. For example, the RAM disk can be used by an OS such as Linux (registered trademark).

The read and write with respect to the above-mentioned virtual storages is conducted on the RAM disk within the guest OS (140, 240), and a request for read and write is not conducted on the virtual machines (130, 230). Because the processing has been completed inside of the guest OS (140, 240), the synchronization processing for the read/write request or the completion interrupt becomes unnecessary.

Specifically, read and write of data for the RAM disk are conducted in the following procedure. First, as initialization of the RAM disk, the contents of the storage devices (115, 215) are loaded on the memories of the guest OS (140, 240) in advance.

In the data read, when the guest OS (140, 240) request the RAM disk to read data, the contents of the storage devices (115, 215) on the RAM disk are notified of the guest OS (140, 240). The virtual interrupt of read completion is unnecessary.

In the data write, when the guest OS (140, 240) request the RAM disk to write data, the data is written in the RAM disk. The virtual interrupt of write completion is unnecessary. Then, the guest OS (140, 240) allows the contents of the RAM disk to be periodically saved in the storage devices (115, 215).

What is claimed is:

1. A fault tolerant system, comprising:
   a primary virtual machine, executed by a first CPU, that is formed on a primary machine in which a primary hypervisor runs, and performs the steps of:
   inputting a virtual interrupt based on an external interrupt from the primary hypervisor to a primary guest OS;
   transmitting timing information on the virtual interrupt to a secondary virtual machine;
   transmitting a theoretical value, which represents a period of time that is calculated based on the execution speed of the primary virtual machine and a number of execution instructions, to the secondary virtual machine;
   collecting operation performance information from the secondary virtual machine; and
   configuring an operation performance of the primary virtual machine and an operation performance of the secondary virtual machine so that the operation performance of the primary virtual machine becomes equal to the operation performance of the secondary virtual machine;
   wherein the secondary virtual machine is executed by a second CPU and formed on a secondary machine in which a secondary hypervisor runs, and performs the steps of:
   receiving the timing information on the virtual interrupt transmitted by the primary virtual machine;
   inputting the virtual interrupt to a secondary guest OS on the basis of the received timing information; and
   executing a context switch to suspend the secondary guest OS and switch a context from the secondary guest OS to the secondary virtual machine at an execution suspension position indicated by the received timing information; and
   a synchronization correction unit, executed within the secondary virtual machine, that performs the steps of:
   receiving the theoretical value transmitted from the primary virtual machine;
   if the secondary virtual machine is lower in execution speed than the primary virtual machine even after the operation performance is configured by the primary virtual machine, determining a measured delay time by subtracting the theoretical value from a measured value, wherein the measured value is a period of time when a fixed period interrupt using a timer occurs in the secondary virtual machine; and if the measured delay time exceeds a predetermined allowable delay time, executing a resynchronization to reset the delay.

2. The fault tolerant system according to claim 1,
wherein the primary virtual machine notifies the secondary virtual machine of the configured operation performance of the secondary virtual machine, and
wherein the secondary virtual machine executes operation according to the notified operation performance.

3. The fault tolerant system according to claim 1,
wherein the operation performance of the primary virtual machine or the operation performance of the secondary virtual machine includes an operating frequency, and
wherein the primary virtual machine collects an operating frequency that is available by the primary virtual machine, and an operating frequency that is available by the secondary virtual machine, and to configure an operating frequency of the primary virtual machine, and an operating frequency of the secondary virtual machine.

4. The fault tolerant system according to claim 1,
wherein if an operation specification of a device used by the primary virtual machine and an operation specification of a device used by the secondary virtual machine are different from each other, the primary virtual machine emulates processing so that processing for the device used by the primary virtual machine becomes identical with processing for the device used by the secondary virtual machine.

5. The fault tolerant system according to claim 4,
wherein if a difference in the operation specifications of the devices resides in whether a given function is present, or not, the primary virtual machine disables the given function, and emulates processing so that the processing for the device used by the primary virtual machine becomes identical with the processing for the device used by the secondary virtual machine, and
wherein if the difference in the operation specifications of the devices resides in a performance or a capacity, the primary virtual machine allows the processing difference in an operation to be executed in an external environment outside of the primary guest OS.

6. The fault tolerant system according to claim 1,
wherein if the operation specification of a device used by the primary virtual machine and the operation specification of a device used by the secondary virtual machine are different from each other, the secondary virtual machine emulates processing so that the processing for the device used by the secondary virtual machine becomes identical with the processing for the device used by the primary virtual machine.

7. The fault tolerant system according to claim 6,
wherein if a difference in the operation specifications of the devices resides in whether a given function is present, or not, the secondary virtual machine disables the given function, and emulates processing so that the processing for the device used by the secondary virtual machine becomes identical with the processing for the device used by the primary virtual machine, and wherein if the difference in the operation specifications of the devices resides in a performance or a capacity, the secondary virtual machine allows the processing difference in the operation to be executed in an external environment outside of the secondary guest OS.

8. The fault tolerant system according to claim 1, wherein the primary virtual machine treats a period time of a fixed period virtual interrupt using the timer as the theoretical value, and the secondary virtual machine treats a period time when the fixed period interrupt using the timer occurs as the measured value.

9. The fault tolerant system according to claim 8,
wherein if the measured delay time is larger than an assumed amount, the secondary virtual machine detects that a failure occurs.

10. The fault tolerant system according to claim 1,
wherein if the secondary virtual machine is lower in the execution speed than the primary virtual machine even after the operation performance is configured, the secondary virtual machine accelerates a virtual interrupt input timing during an idle state of the primary guest OS to overcome a delay of the primary virtual machine.

11. The fault tolerant system according to claim 1,
wherein if the primary virtual machine is higher in the execution speed than the secondary virtual machine even after the operation performance is configured, the primary virtual machine executes an operation with pauses in conformity to the execution speed of the secondary virtual machine.

12. The fault tolerant system according to claim 1,
wherein if the secondary virtual machine is higher in the execution speed than the primary virtual machine even after the operation performance is configured, the secondary virtual machine executes the operation with pauses in conformity to the execution speed of the primary virtual machine.

13. The fault tolerant system according to claim 1,
wherein the primary virtual machine and the secondary virtual machine load the contents of respective storage devices on memories allocated to the respective virtual machines, and to replace a storage device access with a memory access.

14. The fault tolerant system according to claim 13,
wherein when conducting the memory access, the primary virtual machine and the secondary virtual machine input the virtual interrupt to a respective guest OS without waiting for an external interrupt of an access completion.

15. The fault tolerant system according to claim 13,
wherein the primary virtual machine and the secondary virtual machine load the contents of the respective storage devices on RAM disks configured by the respective guest OS, and replace a storage device access with a RAM disk access.

16. The fault tolerant system according to claim 1,
wherein the operation performance information comprhises at least one of an operating frequency, a memory size, a cache size, an operation specification such as TLB (translation look-aside buffer)/EPT (enhanced page table), an MIPS value, and a SPEC value.

17. The fault tolerant system according to claim 1,
wherein the context switching occurs without the use of a break instruction.

* * * * *